United States Patent
Tippenhauer et al.

(10) Patent No.: US 10,567,243 B2
(45) Date of Patent: Feb. 18, 2020

(54) APPARATUS AND METHOD FOR MONITORING A WIRELESS NETWORK

(71) Applicant: SINGAPORE UNIVERSITY OF TECHNOLOGY AND DESIGN, Singapore (SG)

(72) Inventors: Nils Ole Tippenhauer, Singapore (SG); Rajib Ranjan Maiti, Singapore (SG); Sandra Siby, Singapore (SG); Ragav Sridharan, Singapore (SG)

(73) Assignee: SINGAPORE UNIVERSITY OF TECHNOLOGY AND DESIGN, Singapore (SG)

( * ) Notice: Subject to any disclaimer, the term of this patent is extended or adjusted under 35 U.S.C. 154(b) by 0 days.

(21) Appl. No.: 16/041,612

(22) Filed: Jul. 20, 2018

(65) Prior Publication Data

US 2019/0028367 A1    Jan. 24, 2019

Related U.S. Application Data

(60) Provisional application No. 62/535,313, filed on Jul. 21, 2017.

(51) Int. Cl.
| | | |
|---|---|---|
| *H04L 12/26* | (2006.01) | |
| *H04W 24/08* | (2009.01) | |
| *G06F 17/18* | (2006.01) | |
| *H04L 12/24* | (2006.01) | |
| *H04W 84/12* | (2009.01) | |

(52) U.S. Cl.
CPC ............ *H04L 43/026* (2013.01); *G06F 17/18* (2013.01); *H04L 41/142* (2013.01); *H04L 41/16* (2013.01); *H04L 43/045* (2013.01); *H04W 24/08* (2013.01); *H04L 41/22* (2013.01); *H04L 43/062* (2013.01); *H04L 43/12* (2013.01); *H04W 84/12* (2013.01)

(58) Field of Classification Search
CPC ..... H04L 41/142; H04L 41/16; H04L 43/045; G06F 17/18; H04W 24/08
See application file for complete search history.

(56) References Cited

U.S. PATENT DOCUMENTS

| | | | |
|---|---|---|---|
| 2007/0283436 A1* | 12/2007 | Duffield | H04L 63/1425 726/23 |
| 2017/0048698 A1* | 2/2017 | Choffnes | H04L 43/045 |
| 2017/0142644 A1* | 5/2017 | Yun | H04L 67/303 |
| 2017/0302553 A1* | 10/2017 | Zafer | H04L 41/142 |
| 2018/0189667 A1* | 7/2018 | Tsou | G06N 5/003 |
| 2018/0248795 A1* | 8/2018 | Nainar | H04L 12/4633 |
| 2019/0213446 A1* | 7/2019 | Tsou | G06K 9/6257 |

* cited by examiner

*Primary Examiner* — Vivek Srivastava
*Assistant Examiner* — Muhammad Raza
(74) *Attorney, Agent, or Firm* — JCIP; Joseph G. Chu

(57) ABSTRACT

There is provided an apparatus and method to enable passive, real-time monitoring of an existing wireless network. It classifies and identifies threats and/or devices that are communicating using the infrastructure and data traffic patterns of the participating devices. The monitoring information is provided in a manner so as to provide appropriate insights for technical support and home users.

4 Claims, 6 Drawing Sheets

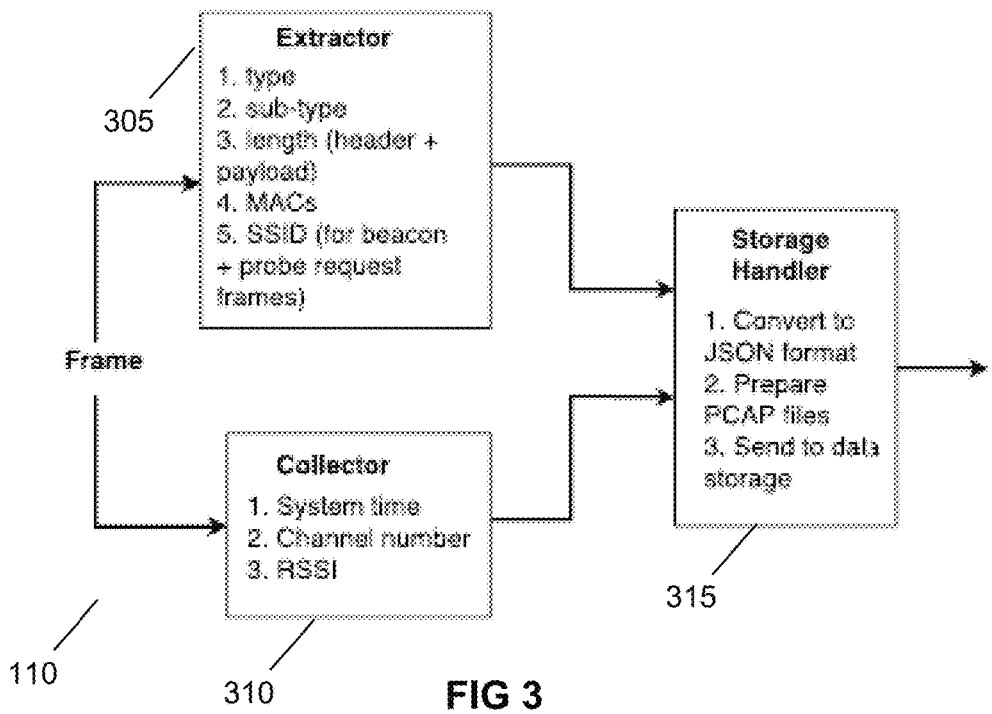
FIG 3
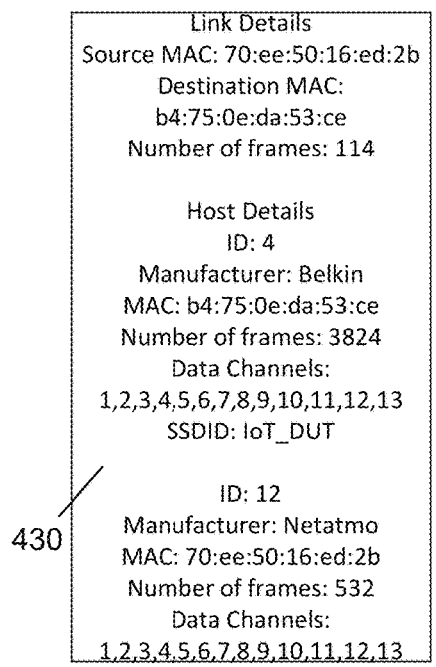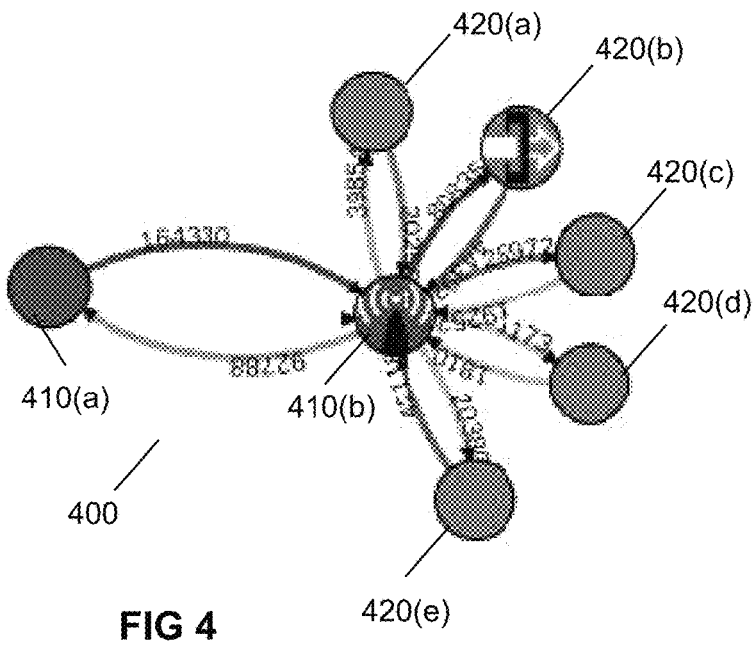
FIG 4

| Notation | Description |
|---|---|
| $T(f)$ | Timestamp of a frame $f$ |
| $First(mac, tp)$ | $T(f)$ of first frame of type/sub-type $tp$ containing MAC address $mac$ |
| $Last(mac, tp)$ | $T(f)$ of last frame of type/sub-type $tp$ containing MAC address $mac$ |
| $W(mac, tp)$ | Observation window size = $Last(mac, tp) - First(mac, tp)$ |
| $C(mac, tp)$ | Number/size of frames with MAC address $mac$ and type/sub-type $tp$ |
| $S(mac, tp)$ | Number/size of frames sent by a given $mac$ of type/ sub-type $tp$ |
| $R(mac, tp)$ | Number/size of frames received by a given $mac$ of type/ sub-type $tp$ |
| $len(mac, tp)$ | Size of frame of type/sub-type $tp$ for $mac$ |
| $gaps(mac, tp)$ | Inter-arrival times of frame of type/sub-type $tp$ for $mac$ |

FIG 6

| Feature | Notation | Calculation |
|---|---|---|
| Rate | $t(mac, tp)$ | $\frac{C(mac, tp)}{W(mac, tp)}$ |
| Fraction | $f_a(mac, tp)$ | $\frac{C(mac, tp)}{C(all\_mac, tp)}$ |
|  | $f_t(mac, tp)$ | $\frac{C(mac, tp)}{C(mac, all\_tp)}$ |
| Ratio | $r_s(mac, tp)$ | $\frac{S(mac, tp)}{C(mac, tp)}$ |
|  | $r_r(mac, tp)$ | $\frac{R(mac, tp)}{C(mac, tp)}$ |
| Load | $s_m(mac, tp)$ | $mean(len(mac, tp))$ |
|  | $s_d(mac, tp)$ | $std(len(mac, tp))$ |
| Delta | $d_m(mac, tp)$ | $mean(gaps(mac, tp))$ |
|  | $d_d(mac, tp)$ | $std(gaps(mac, tp))$ |

FIG 7

APPARATUS AND METHOD FOR MONITORING A WIRELESS NETWORK

FIELD OF INVENTION

The present invention relates to the field of monitoring wireless networks.

BACKGROUND

In the context of the fast growing sector for Internet of Things (IoT) devices, there are forecasts that each household will use up to five hundred IoT devices in the coming years. These IoT devices need to be able to be connected to a data network in order to function in a desired manner. Typically, communication standards such as, for example, Zigbee, Bluetooth, Bluetooth Low Energy, WiFi and the like are used to enable connection of the IoT devices to mesh networks, or single-hop access points.

Although wireless communications provide many benefits and conveniences in terms of usability, and accessibility, there are several issues in relation to security of the data being transmitted to/from each IoT device. These issues include, for example, privacy, controllability, and so forth. Unfortunately, the adverse effects of these issues are amplified with this growth in the number of IoT devices, and increases in the size/complexity of the wireless networks.

Without appropriate solutions to better understand the wireless data traffic, all users of IoT devices will be placed in jeopardy, and the advantages brought forth by the IoT devices will also be diminished. It is evident that the appropriate solutions are critical in relation to maintaining the proliferation of IoT devices into daily lives.

SUMMARY

In a first aspect, there is provided an apparatus for monitoring a wireless network. The apparatus includes at least one data processor configured to: receive, from at least one user device, data from the at least one user device;
  extract, from the received data, information from a frame header; prune, from the received data, unnecessary features; group, from the received data, basic features based on MAC addresses;
  determine, from the received data, processed features based on block size; and
  identify, from the received data, unusual data traffic patterns.

In a second aspect, there is provided a data processor implemented method for monitoring a wireless network, the method comprising:
  receiving, from at least one user device, data from the at least one user device;
  extracting, from the received data, information from a frame header;
  pruning, from the received data, unnecessary features;
  grouping, from the received data, basic features based on MAC addresses;
  determining, from the received data, processed features based on block size; and
  identifying, from the received data, unusual data traffic patterns.

It will be appreciated that the broad forms of the invention and their respective features can be used in conjunction, interchangeably and/or independently, and reference to separate broad forms is not intended to be limiting.

DESCRIPTION OF FIGURES

A non-limiting example of the present invention will now be described with reference to the accompanying drawings, in which:
FIG. 3 is a schematic view of an example traffic analyser of FIG. 1;
FIG. 4 is an example visual representation provided by the apparatus of FIG. 1;
FIG. 6 shows a table of parameters used to determine the processed features;
FIG. 7 shows examples of formulas for determining processed features.

DETAILED DESCRIPTION

Embodiments of the present invention provide an apparatus and method to enable passive, real-time monitoring of an existing wireless network. It classifies and identifies threats and/or devices that are communicating using the infrastructure and data traffic patterns of the participating devices. The monitoring information is provided in a manner so as to provide appropriate insights for technical support and home users. There is a focus on providing real-time analysis and visualization of the scanned network.

Figure 1:
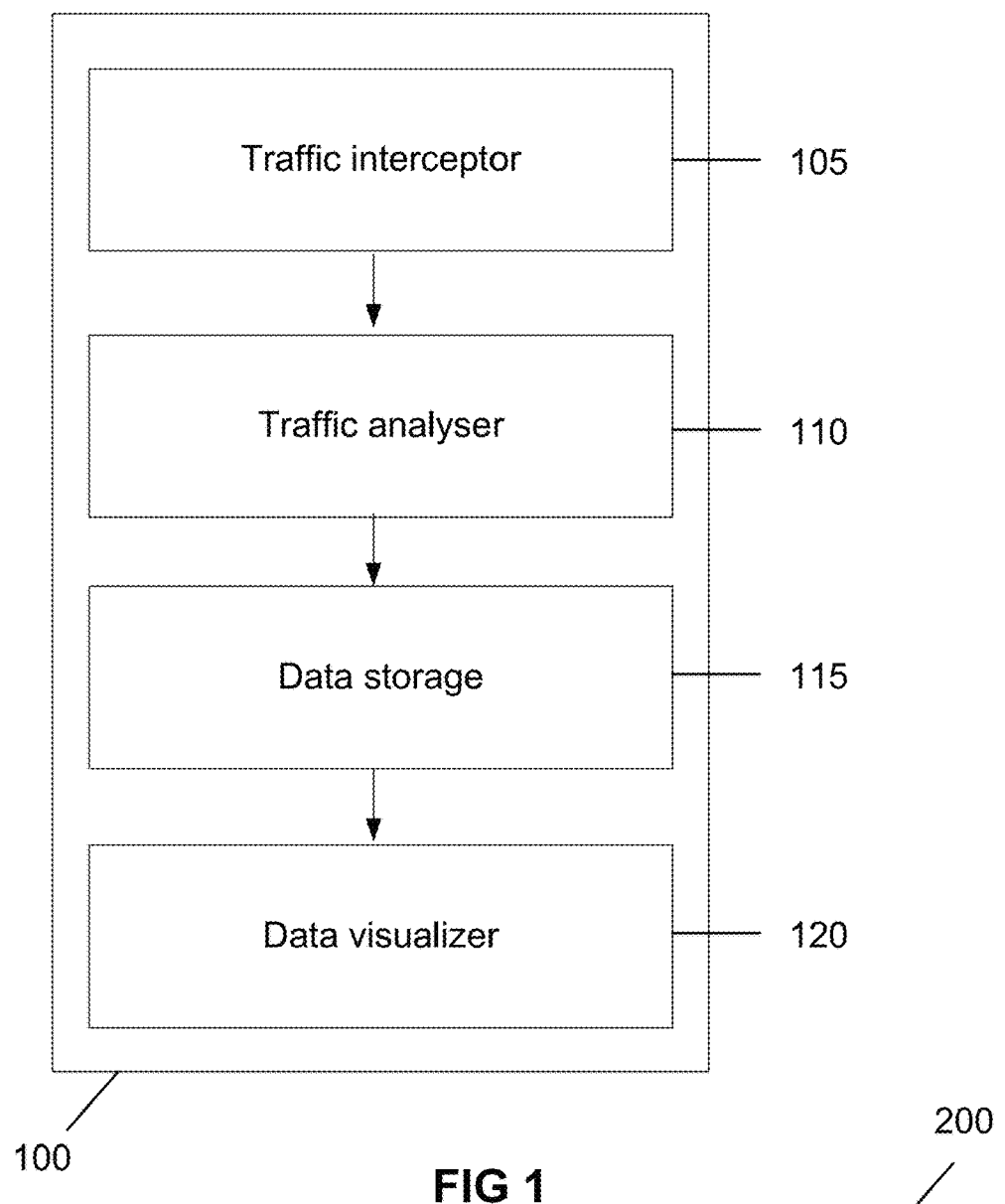
FIG. 1 is a schematic view of a first example apparatus for monitoring a wireless network.

Referring to FIG. 1, there is provided an apparatus 100 for monitoring a wireless network. The apparatus 100 is configured to provide real-time, passive monitoring of the wireless network which can constitute an IoT environment. The apparatus 100 will identify active devices that are communicating within the wireless network, and attempt to categorize the devices depending on various parameters.

Figure 2:
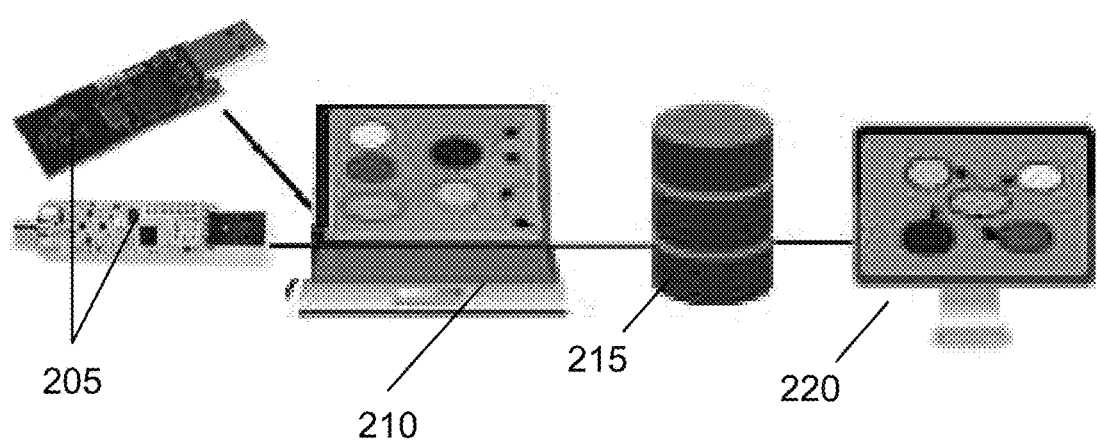
FIG. 2 is an example of an experimental set-up used to represent the apparatus of FIG. 1.

The apparatus 100 detects network traffic at a link layer, and then processes the traffic using frame header information. The apparatus 100 can be either a standalone device, or integrated within other electronic devices such as televisions. FIG. 2 shows an experimental set-up configured to represent various modules of the apparatus 100.

The apparatus 100, while intercepting wireless data traffic, typically relies on two input parameters:
  dwell time ($T_d$): a period of time (in seconds) that the apparatus 100 latches onto a channel before moving to another channel; and
  hops ($T_h$): a number of channel hops carried out by the apparatus 100.

The input parameters determine an amount of time that the apparatus 100 is intercepting the wireless data traffic. For example, when $T_h=13$ and $T_d=5$ s, the apparatus 100 scans for 13×5=65 s, and monitoring of the wireless network is carried out only during this duration.

The apparatus 100 includes a traffic interceptor 105, a traffic analyser 110, a data storage 115 and a data visualizer 120. Details of each component will be provided in the following paragraphs. It should be appreciated that the arrows shown in FIG. 1 denote a flow of data within the apparatus 100.

Traffic Interceptor 105

The traffic interceptor 105 is configured to provide flexible access to the wireless network. Wireless networks relying on commonly used protocols, such as, for example, 802.11/WiFi, Bluetooth, Bluetooth Low Energy (BLE), Zigbee, and Z-Wave and the like, should be able to be accessed by the traffic interceptor 105. It should be noted that particular protocols are used in a more prevalent manner in particular application areas. For example, computing devices accessing the Internet use WiFi, wearable devices use Bluetooth/BLE, smart home appliances use Zigbee, electronic home appliances use Z-Wave protocols and so forth. In many instances, the protocol used by the respective devices can depend on, for example, respective usage ranges, respective usage environment, respective energy consumption behaviour, and so forth.

As such, the traffic interceptor 105 is configured to have interception capabilities for multiple protocols, either by having at least one receiver for each protocol, or software managed receivers configured to process the multiple protocols. It should be appreciated that the traffic interceptor 105 should also be able to have interception capabilities for multiple channels of each of the multiple protocols.

In FIG. 2, the traffic interceptor 105 is implemented by using at least one radio chipset 205. For the sake of illustration, the following chipsets can be used, for example, a TP-Link TL-WN722N 802.11n wireless adapter (for WiFi), an Ubertooth One (for Bluetooth LE), an Atmel-RZUSBstick (for Zigbee) and so forth.

For the sake of illustration, the WiFi chipset will be described in greater detail. The TP-Link TL-WN722N adapter can be connected via a USB connection and configured to operate in a monitor mode to capture WiFi frames with sequential channel hopping (more than thirteen channels) functionality so as to obtain an overview of the traffic on all channels. During channel hopping, the adaptor can be configured to dwell on a particular channel for a pre-determined period of time before hopping to a subsequent channel. The dwell duration can be pre-defined by a user, or can be a default duration. Moreover, as only one channel is monitored at any juncture, there will be frames other channels which will not be captured. Thus, a subset of the overall traffic is captured which provides a reasonable sample size for carrying out an analysis.

Traffic Analyser 110

The traffic analyser 110 is configured to process each link layer frame which is captured by the traffic interceptor 105. The traffic analyser 110 extracts information from a frame header for subsequent analytics, such as, for example, source and destination addresses, frame type and sub-type, SSIDs present, and so forth.

Typically, the frames are processed on a protocol by protocol basis, because parsing frames from different protocols involves different processes. Furthermore, the traffic analyser 110 is configured to record further information such as, for example, a channel number that the traffic interceptor 105 used to capture the traffic, size of the captured frame (in bytes), timestamp of when the frame is captured, and so forth.

The traffic analyser 110 subsequently, transmits the extracted frame information to the data storage 115 on a per frame basis.

Referring to FIG. 2, the traffic analyser 110 is implemented using a portable computer 210. Referring to FIG. 3, the traffic analyser 110 consists of three sub-modules, an extractor 305, a collector 310, and a storage handler 315.

In one embodiment, the extractor 305 and the collector 310 are implemented using Scapy, a software for packet capture and analysis. Every frame captured by the traffic interceptor 105 is input to both the extractor 305 and the collector 310. As the objective of the apparatus 100 is to provide a cursory overview of the wireless network, only pertinent pieces of information are extracted from every captured frame. The extraction of the information is performed real-time (without buffering) so as obtain sufficient information to provide an overview of the environment.

The extractor 305 extracts the following parameters such as, for example:
- In WiFi frames (type, sub-type, length, MAC address and SSID);
- In BLE frames (type, length, MAC address type (public or random), MAC address, node local name); and
- In Zigbee frames (type, length, PAN ID, addresses).

The aforementioned parameters can be known as basic features.

The collector 310 gathers information such as, for example:
- the system time during frame capture;
- the channel number on which the frame is captured; and
- the RSSI (for potential device localization).

Both of the extractor 305 and the collector 310 transmit the captured information to a storage handler 315. The storage handler 315 transmits the captured information to the data storage 115. In an embodiment, the storage handler 315 transmits the captured information (in JSON format) to the data storage 115 via HTTP POST method. Alternatively, the storage handler 315 is configured to store the information in a PCAP file and periodically transmit the PCAP files to the data storage 115.

The basic features can be grouped based on the MAC addresses to determine processed features. Typically, since there may not be any correlation between the service(s) provided or activities performed and the MAC address used by a device, MAC addresses or manufacturer information (that can be obtained from a MAC address) are disregarded.

To determine the processed features, the input of one parameter called block size is required. Block size indicates a minimum number of frames that is required to start determining the processed features. If an input PCAP file contains more than a block size number of frames, the number of frames is divided into separate groups, each group containing a block size number of frames, with each group being processed separately. The processed features can be broadly grouped into five categories as follows: rate, fraction, ratio, load and delta. Parameters used to determine the processed features are shown in FIG. 6.

Processed features in the rate category describe the rate at which frames are received or sent by a device. They are computed by determining a number of frames of a particular type or sub-type to the observation window size.

Processed features in the fraction category comprise two types—aggregated and individual. Aggregated fraction features provide an indication of the contribution of each device to the total traffic, while individual fraction features provide an indication of the frame type composition for each device.

Processed features in the ratio category determine a direction of the traffic and groups the data into sent and received traffic.

The rate, fraction and ratio categories are determined in terms of both the number of frames and the sum of the sizes of the frames.

Processed features in the load category calculate the mean and standard deviation for sizes of different frames types.

Finally, processed features in the delta category determine the inter-arrival times of different frame types and determine the mean and standard deviation of these times.

FIG. 7 shows the respective formulas to determine the processed features.

In some embodiments, feature pruning can be carried out. The feature pruning/selection can be used to remove features that may be redundant for efficient classification. Feature pruning is carried out using statistical analysis such as calculating standard deviation and variance inflation factor to identify a set of important features to be used for efficient classification. The following steps may be carried out to obtain a reduced set of features that can have a more significant impact on classification:

1. Removing a feature having a constant value (i.e., standard deviation=0) across all the devices, assuming it may not have any impact on the classification. Sometimes, such features are present due to how frames with certain sub-types are not visible in the network.

2. Removing a feature from a pair of features having high correlation coefficient. It finds all pairs of independent features with an absolute value of Pearson correlation coefficient greater than 0.5. For each of those pairs, it determines the VIF (Variance Inflation Factor) and discards the one having greater VIF. The procedure is repeated until no pairs have high correlation coefficient. 'USDM' package in R can be used for this purpose.

Other than removing features, features can be selected for anomaly detection and classification.

In some embodiments, model training can be carried out for predictive purposes by taking two inputs—a set of signatures from the feature pruner and the set of MAC addresses to device types mapping from device annotator. The MAC addresses are used only for annotating a signature, not for classification.

For example, the following three supervised machine learning algorithms can be used: CART (Classification And Regression Tree), RF (Random Forest) and SVM (Support Vector Machine). The following R packages: 'rpart', 'randomForest' and 'e1071' can be used for CART, RF and SVM respectively. Ten-fold cross-validation using the 'caret' package can be carried out when building the models. The model training can also provides a ranking of features based on their importance in the classification task to fine-tune the set of features for future classification tasks.

In some embodiments, the traffic analyser 110 can include an anomaly module which can be configured to learn traffic patterns of respective devices connected to the wireless network such that anomalies in traffic patterns for the respective devices can be detected. In the anomaly module, a random forest model can be trained with signatures of different attacks. Each anomaly traffic signature can be labelled manually with an associated attack (for example, slowloris or UDP flood). A random forest package in R is used to build a random forest model and a caret package in R for ten-fold cross-validation, model tuning, and to evaluate the performance of the model. Training of the model can be activated only when an anomaly is detected.

Data Storage 115

The data storage 115 provides a non-volatile storage medium for storing the information for the processed frames from the traffic analyser 110. The non-volatile storage medium can be provided by a hard disk drive or by a solid state drive.

The storage of the information can be carried out using a typical database system which can facilitate input of queries to mine the database. For example, APIs can be used to provide functions such as, for example, storage and retrieval of frame information, generalised categorical queries on the database, storage and retrieval of analysed results, and so forth.

Referring to FIG. 2, the data storage 115 is implemented as a database server 215 which can be accessible via a set of APIs, to store and retrieve the extracted/collected frame information. The database server 215 interacts with the traffic analyser 210 and the data visualizer 120 using the APIs. For example, the APIs in the server 215 are developed using Flask (a Python web framework).

Data Visualizer 120

The data visualizer 120 is configured to provide a visual representation of the assessed wireless network during a pre-defined time window or in a real-time application. The visual representation can be provided from different perspectives, such as, for example, cyber threats, device-to-device connection, device to hub connection, ongoing data traffic, and so forth. In some embodiments the visual representation is able to provide information pertaining to underlying activities at the wireless network, and enables users to take steps to safeguard their own interests. In some embodiments, the visual representation provides an inventory of devices which are detectable in the wireless network, and the amount of traffic generated by each device within the wireless network.

Referring to FIG. 2, the data visualizer 120 is implemented using a display device 220. The data visualizer 120 can be displayed on hand-held devices, and desktop devices. This can be via either dedicated software or web browsers. Typically, the data visualizer 120 provides a display of a wireless network environment in various ways, for example, summary text, connectivity graph, bipartite relation, and so forth. The data visualizer 120 is provided to enable a user to understand different aspects of the wireless network environment.

FIG. 4 shows a sample network graph 400 depicted in the data visualizer 120. A first node 410(a) and a second node 410(b) are shown and arrows between the nodes 410(a), 410(b) indicate that the pair exchange at least one frame. IoT devices 420(a) to (d) in the wireless network are also indicated. It is possible to identify access points from beacon and probe request frames and internet gateways using heuristics. The access points and gateways can be assigned visual icons to identify them in the data visualizer 120. A side pane 430 depicted in the data visualizer 120 provides information of a selected node 410 or device 420 in the network graph 400. In this example, the side pane 430 shows linkage and host details.

Classification of Devices

One application of the apparatus 100 is for the classification of devices connected to the wireless network. An analysis of captured data traffic is utilised to classify the various devices and nodes. The following parameters are analysed:

frames;
sent and received data volume; and
sent-to-received data ratio.

With regard to frames, data traffic is determined in terms of bytes and frames. Typically, frames can be used to classify respective devices and nodes when the respective devices are in an active/high mode.

With regard to "sent and received data volume", data traffic is also determined in terms of bytes and frames. Typically, "sent and received data volume" can also be used to classify respective devices and nodes when the respective devices are in an active/high mode.

With regard to "sent-to-received data ratio", data traffic is also determined in terms of bytes and frames. Typically, "sent-to-received data ratio" can also be used to classify respective devices and nodes when the respective devices are in an active/high mode.

The apparatus 100 enables users to carry out passive, real-time monitoring of an existing wireless network. It classifies and identifies devices that are communicating using the infrastructure and data traffic patterns of the participating devices. The monitoring information is provided in a manner so as to provide appropriate insights for technical support and home users. There is also a focus on providing real-time analysis and visualization of the scanned network.

Classification of Cyber Threats

The apparatus 100 can be used for the classification of cyber threats. The apparatus 100 can be configured to detect attacks that occur on layer 3 and above over wireless networks, without decrypting information at network-layer (or above), thereby ensuring the privacy of users. It is desired that the apparatus 100 maximizes accuracy by utilising a trained system for identifying particular forms of attack and consequently raises minimal false alarms.

The apparatus 100 can provide passive, real-time monitoring of an existing wireless network. It classifies and identifies threats and/or devices that are communicating using the infrastructure and data traffic patterns of the participating devices. The monitoring information is provided in a manner so as to provide appropriate insights for technical support and home users.

Figure 5:
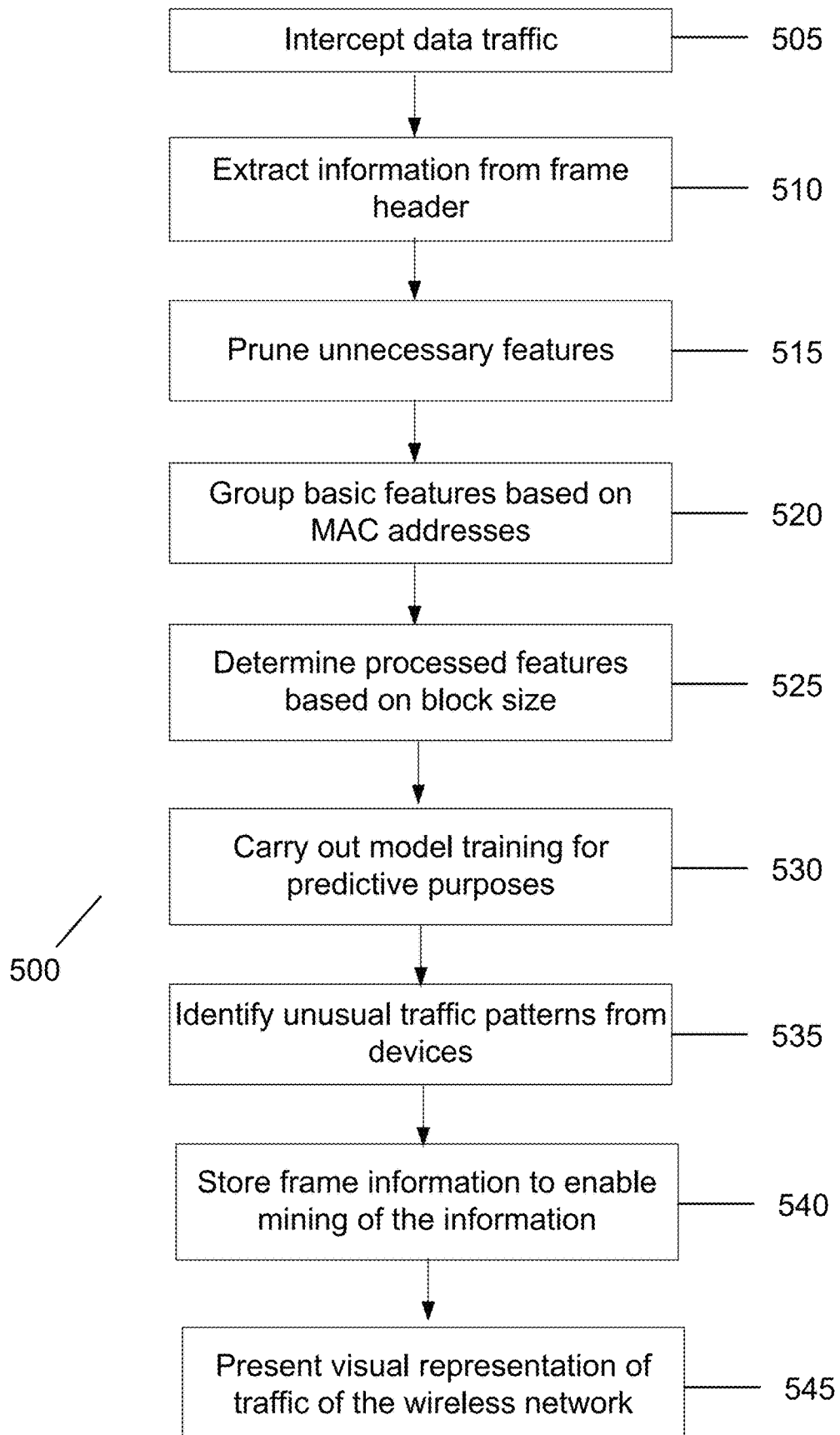
FIG. 5 is an example of a method for monitoring a wireless network.

Referring to FIG. 5, there is provided a process flow for a method 500 for monitoring a wireless network. It should be appreciated that the apparatus 100, or specifically, at least one data processor of the apparatus 100 can be used to carry out the method 500, but the method 500 can possibly be carried out by more than one device. The method 500 is able to provide similar benefits as the apparatus 100.

At step 505, data traffic is intercepted, the data traffic being on commonly used protocols, such as, for example, 802.11/WiFi, Bluetooth, Bluetooth Low Energy (BLE), Zigbee, and Z-Wave and the like. The interception of the data traffic can be carried out for multiple channels of each of the multiple protocols. The interception of the data traffic can be carried out by a radio chipset as described in earlier paragraphs.

At step 510, information is extracted by each link layer frame from the intercepted data traffic. Typically, the frames are processed on a protocol by protocol basis, because parsing frames from different protocols involves different processes. In one embodiment, the information extraction can be implemented using Scapy, a software for packet capture and analysis. The following parameters can be extracted, such as, for example:

In WiFi frames (type, sub-type, length, MAC address and SSID);
In BLE frames (type, length, MAC address type (public or random), MAC address, node local name); and
In Zigbee frames (type, length, PAN ID, addresses).

The above parameters can be known as basic features.

At step 515, pruning of unnecessary features can be carried out. The feature pruning/selection can be used to remove features that may be redundant for efficient classification. Feature pruning is carried out using statistical analysis such as calculating standard deviation and variance inflation factor to identify a set of important features to be used for efficient classification. The following steps may be carried out to obtain a reduced set of features that can have a more significant impact on classification:

1. Removing a feature having a constant value (i.e., standard deviation=0) across all the devices, assuming it may not have any impact on the classification. Sometimes, such features are present due to how frames with certain sub-types are not visible in the network.

2. Removing a feature from a pair of features having high correlation coefficient. It finds all pairs of independent features with an absolute value of Pearson correlation coefficient greater than 0.5. For each of those pairs, it determines the VIF (Variance Inflation Factor) and discards the one having greater VIF. The procedure is repeated until no pairs have high correlation coefficient. 'USDM' package in R can be used for this purpose.

At step 520, the basic features can be grouped based on MAC addresses to determine processed features.

At step 525, the processed features are determined based on block size. Block size indicates a minimum number of frames that is required to start determining the processed features. If an input PCAP file contains more than a block size number of frames, the number of frames is divided into separate groups, each group containing a block size number of frames, with each group being processed separately. The processed features can be broadly grouped into five categories as follows: rate, fraction, ratio, load and delta. Parameters used to determine the processed features are shown in FIG. 6. The respective categories of the processed features are described in earlier paragraphs. FIG. 7 shows the respective formulas to determine the processed features.

At step 530, model training can be carried out for predictive purposes. The training can be carried out by taking two inputs—a set of signatures from the feature pruner and the set of MAC addresses to device types mapping from device annotator. The MAC addresses are used only for annotating a signature, not for classification.

For example, the following three supervised machine learning algorithms can be used: CART (Classification And Regression Tree), RF (Random Forest) and SVM (Support Vector Machine). The following R packages: 'rpart', 'random Forest' and 'e1071' can be used for CART, RF and SVM respectively. Ten-fold cross-validation using the 'caret' package can be carried out when building the models. The model training can also provides a ranking of features based on their importance in the classification task to fine-tune the set of features for future classification tasks.

At step 535, unusual traffic patterns from respective devices can be identified. This can be carried out using an anomaly module which can be configured to learn traffic patterns of respective devices connected to the wireless network such that anomalies in traffic patterns for the respective devices can be detected. In the anomaly module, a random forest model can be trained with signatures of different attacks. Each anomaly traffic signature can be labelled manually with an associated attack (for example, slow loris or UDP flood). A random forest package in R is used to build a random forest model and a caret package in R for ten-fold cross-validation, model tuning, and to evaluate the performance of the model. Training of the model can be activated only when an anomaly is detected.

At step 540, the frame information can be stored to enable subsequent mining of the stored information. The storage of the frame information can be carried out using a typical database system which can facilitate input of queries to mine the database. For example, APIs can be used to provide functions such as, for example, storage and retrieval of frame information, generalised categorical queries on the database, storage and retrieval of analysed results, and so forth.

Finally, at step 545, a visual representation of traffic of the wireless network is provided. The visual representation of the assessed wireless network can be provided during a pre-defined time window or in a real-time application. The visual representation can be provided from different perspectives, such as, for example, cyber threats, device-to-device connection, device to hub connection, ongoing data traffic, and so forth. In some embodiments the visual representation is able to provide information pertaining to underlying activities at the wireless network, and enables users to take steps to safeguard their own interests. In some embodiments, the visual representation provides an inventory of devices which are detectable in the wireless network, and the amount of traffic generated by each device within the wireless network.

The method 500 can provide passive, real-time monitoring of an existing wireless network. It classifies and identifies threats and/or devices that are communicating using the infrastructure and data traffic patterns of the participating devices. The monitoring information is provided in a manner so as to provide appropriate insights for technical support and home users.

Figure 8:
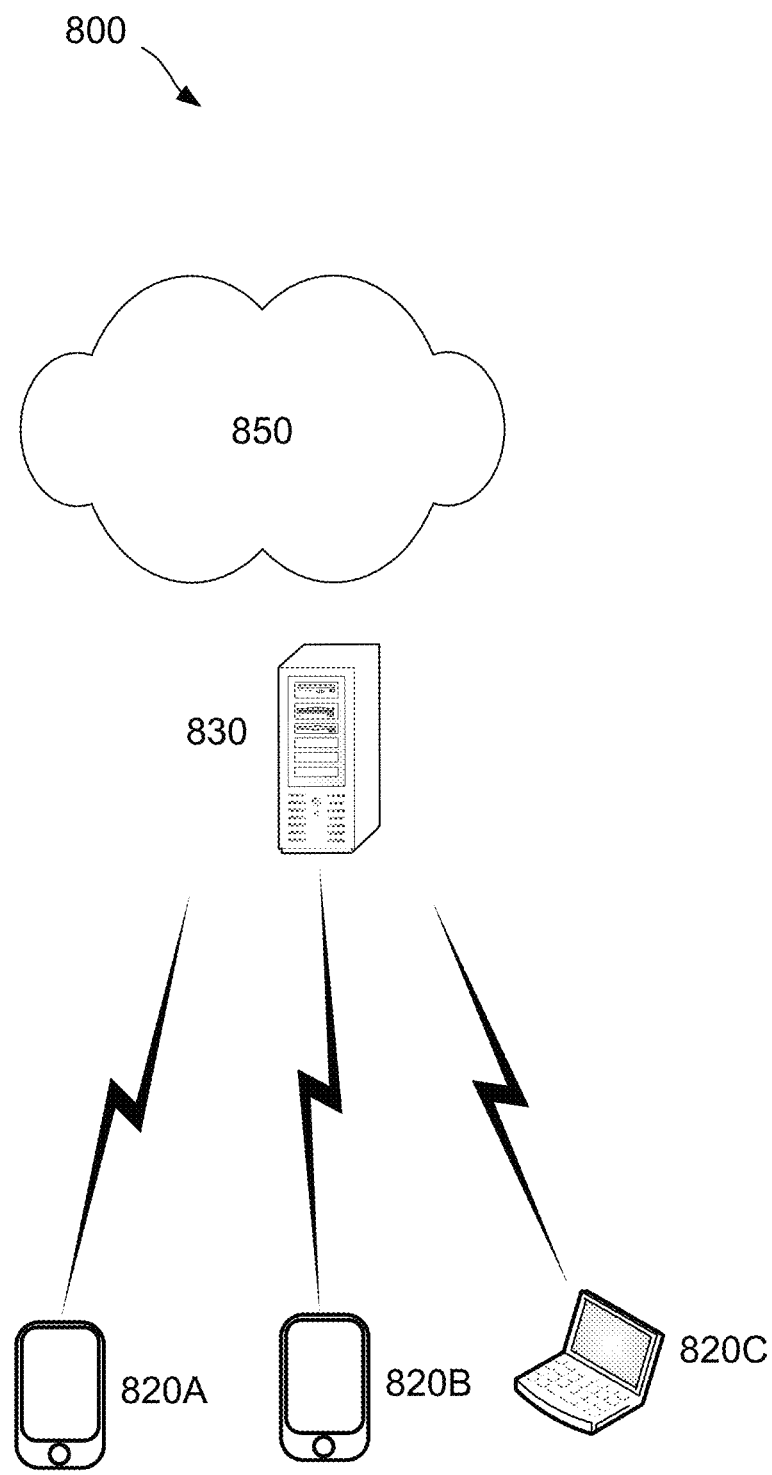
FIG. 8 is a schematic diagram of an example of a system where the apparatus of FIG. 1 is deployed.

An example of a system where the apparatus 100 is deployed will now be described with reference to FIG. 8.

In this example, the system 800 includes one or more user devices 820 accessing a communications network 850, and a computing device 830 that is configured to operate like the apparatus 100. The user devices 820 can include, for example, smart phones, tablet computers, laptop computers, desktop computers, and so forth. In the system 800, the computing device 830 is configured to operate like the apparatus 100 by having the requisite hardware components and software modules.

The communications network 850 can be of any appropriate form, such as the Internet and/or a number of local area networks (LANs). It will be appreciated that the configuration shown in FIG. 8 is for the purpose of example only, and in practice the user devices 820, the computing device 830 can communicate via any appropriate mechanism, such as, for example, via wireless connections, including, but not limited to mobile networks, private networks, such as an 802.11 network, the Internet, LANs, WANs, or the like, as well as via direct or point-to-point connections, such as Bluetooth, or the like.

Computing Device 830

Figure 9:
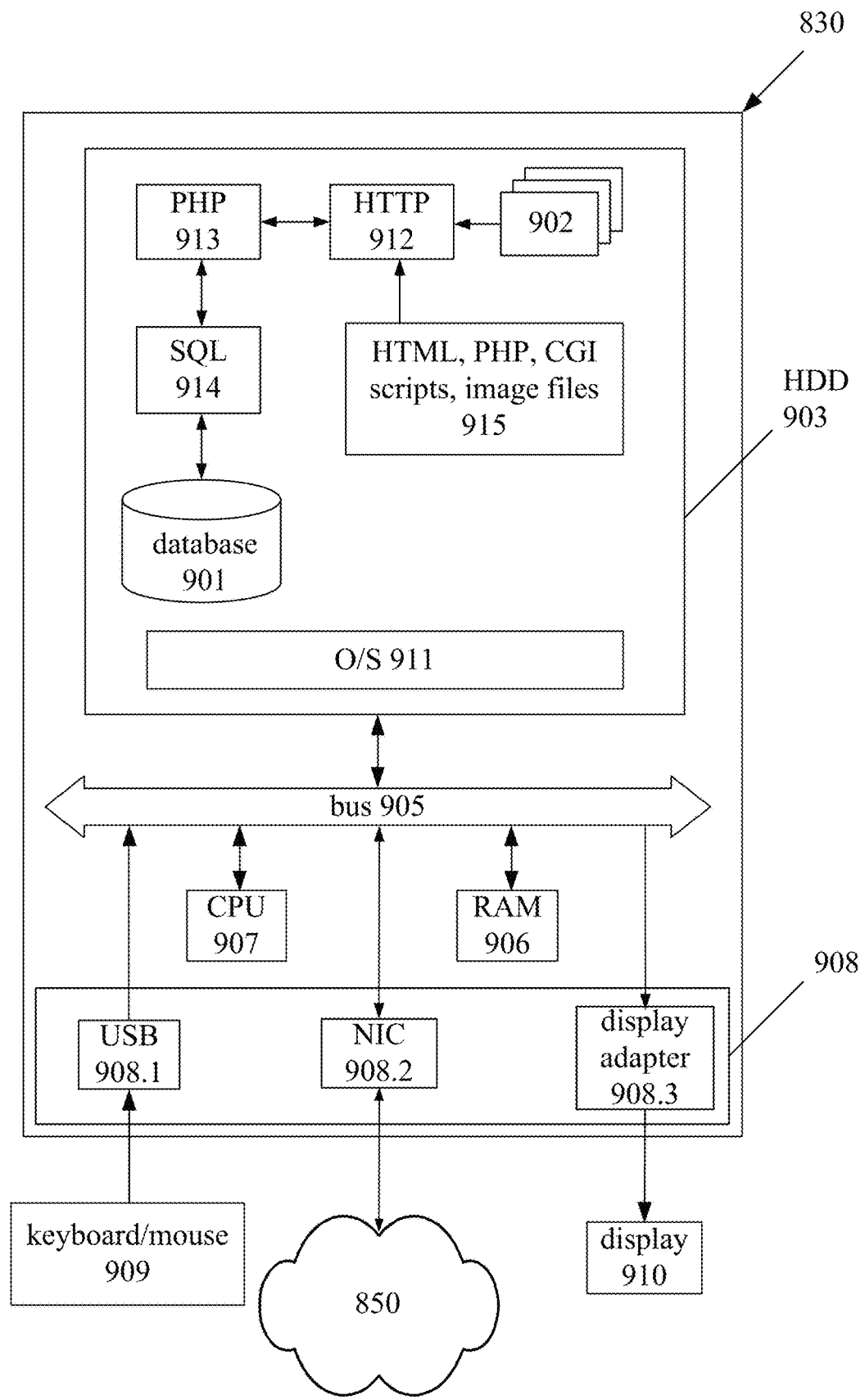
FIG. 9 is a schematic diagram showing a computing device that can be configured to operate like the apparatus of FIG. 1.

The computing device 830 of any of the examples herein may be formed of any suitable processing device, and one such suitable device is shown in FIG. 9.

The computing device 830 is able to intercept signals from the user devices 820 when the user devices 820 are used to access the communications network 250 using standard communication protocols.

The components of the computing device 830 can be configured in a variety of ways. The components can be implemented entirely by software to be executed on standard computer hardware, which may comprise one hardware unit or different computer hardware units distributed over various locations, some of which may require the communications network 850 for communication. A number of the components or parts thereof may also be implemented by application specific integrated circuits (ASICs) or field programmable gate arrays.

In the example shown in FIG. 9, the computing device 830 is a commercially available computer system based on a 32 bit or a 64 bit Intel architecture, and the processes and/or methods executed or performed by the computing device 830 are implemented in the form of programming instructions of one or more software components or modules 902 stored on non-volatile (e.g., hard disk) computer-readable storage 903 associated with the computing device 830. At least parts of the software modules 902 could alternatively be implemented as one or more dedicated hardware components, such as application-specific integrated circuits (ASICs) and/or field programmable gate arrays (FPGAs).

The computing device 830 includes at least one or more of the following standard, commercially available, computer components, all interconnected by a bus 905:

1. random access memory (RAM) 906;
2. at least one computer processor 907, and
3. external computer interfaces 908:
   a. universal serial bus (USB) interfaces 908.1 (at least one of which is connected to one or more user-interface devices, such as a keyboard, a pointing device (e.g., a mouse 909 or touchpad),
   b. a network interface connector (NIC) 908.2 which connects the computing device 830 to the communications network 850; and
   c. a display adapter 908.3, which is connected to a display device 910 such as a liquid-crystal display (LCD) panel device.

The computing device 830 can include a plurality of standard software modules, including:

1. an operating system (OS) 911 (e.g., Linux or Microsoft Windows);
2. web server software 912 (e.g., Apache, available at http://www.apache.org);
3. scripting language modules 913 (e.g., personal home page or PHP, available at http://www.php.net, or Microsoft ASP); and
4. structured query language (SQL) modules 914 (e.g., MySQL, available from http://www.mysql.com), which allow data to be stored in and retrieved/accessed from an SQL database.

The boundaries between the modules and components in the software modules 902 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the steps of the processes performed by the computing device 830 may be executed by a module (of software modules 902) or a portion of a module. The processes may be embodied in a non-transient machine-readable and/or computer-readable medium for configuring a computer system to execute the method. The software modules may be stored within and/or transmitted to a computer system memory to configure the computer system to perform the functions of the module.

The computing device 830 normally processes information according to a program (a list of internally stored instructions such as a particular application program and/or an operating system) and produces resultant output information via input/output (I/O) devices 908. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. An apparatus for monitoring a wireless network, the apparatus including at least one memory and at least one hardware processor configured to:
    receive, from at least one user device, data from the at least one user device;
    extract, from the received data, information from a frame header, wherein the extracted information is at least one parameter selected from a group consisting of: source and destination addresses, frame type and sub-type, and SSIDs present;
    prune, from the received data, unnecessary features, wherein pruning of unnecessary features aids in classification of the extracted information, the pruning being carried out using statistical analysis;
    group, from the received data, basic features based on MAC addresses;
    determine, from the received data, processed features based on block size;
    carry out model training for predictive purposes, wherein the model training is carried out by taking two inputs: a set of signatures from the feature pruner and the set of MAC addresses to device types mapping from device annotator;
    identify, from the received data, unusual data traffic patterns;
    store frame information to enable mining of the information; and
    present a visual representation of data traffic in the wireless network, wherein the visual representation is provided either for a pre-defined time window or for a real-time juncture.

2. The apparatus of claim 1, wherein the data is receivable via multiple transmission protocols.

3. A data processor implemented method for monitoring a wireless network, the method comprising:
    receiving, from at least one user device, data from the at least one user device;
    extracting, from the received data, information from a frame header, wherein the extracted information is at least one parameter selected from a group consisting of: source and destination addresses, frame type and sub-type, and SSIDs present;
    pruning, from the received data, unnecessary features, wherein pruning of unnecessary features aids in classification of the extracted information, the pruning being carried out using statistical analysis;
    grouping, from the received data, basic features based on MAC addresses;
    determining, from the received data, processed features based on block size;
    carrying out model training for predictive purposes, wherein the model training is carried out by taking two inputs: a set of signatures from the feature pruner and the set of MAC addresses to device types mapping from device annotator;
    identifying, from the received data, unusual data traffic patterns;
    storing frame information to enable mining of the information; and
    presenting a visual representation of data traffic in the wireless network, wherein the visual representation is provided either for a pre-defined time window or for a real-time juncture.

4. The method of claim 3, wherein the data is receivable via multiple transmission protocols.

* * * * *